May 5, 1964

W. R. EPPERLY ETAL 3,132,079

PURIFICATION OF AN ORGANIC MATERIAL BY
DISTILLATION AND ADSORPTION

Filed Dec. 21, 1960

William R. Epperly
Russell R. Johnson    Inventors

By *Richard N. Nagel*

Patent Attorney

United States Patent Office 3,132,079
Patented May 5, 1964

3,132,079
PURIFICATION OF AN ORGANIC MATERIAL BY DISTILLATION AND ADSORPTION
William Robert Epperly, New Providence, and Russell Robarts Johnson, Mountainside, N.J., assignors to Esso Research and Engineering Company, a corporation of Delaware
Filed Dec. 21, 1960, Ser. No. 77,395
12 Claims. (Cl. 202—67)

The instant invention relates broadly to the removal of impurities from organic or hydrocarbon materials. More specifically, it relates to impurity removal by an inventive, combination process which integrates distillation and selective adsorption to produce a substantially impurity-free hydrocarbon stream. The invention in more detail relates to partially removing impurities from a hydrocarbon stream by distillation, completing impurity removal with solid selective adsorbents, employing a portion of the impurity-free product to desorb spent, solid selective adsorbent and distilling said portion of said product and the desorbed impurities with the hydrocarbon stream.

The purification of organic or hydrocarbon feed streams has been a problem confronting the petroleum industry since its inception. Impurities may be present in the hydrocarbons from many sources, e.g., in the crude as recovered from the ground, by-products resulting from various treating methods, etc. The problem is so widely known and obviously inherent in the industry that a single instance suffices to exemplify both the need and the utility of the instant invention.

For this purpose, a discussion of the recovery of a $C_5/C_6$ cut from naphtha is of interest. As is well known, the crude is fractionated into a variety of products, one of which is full range naphtha, which contains those constituents boiling up to about 400° F. As the crude generally contains sulfur impurities, so also will this naphtha fraction. It is customary to hydrofine the naphtha in the presence of a catalyst and hydrogen to convert the sulfur impurities, which are undesirable because of their odor and corrosion properties, to $H_2S$. Some mercaptans, however, may not be so converted by hydrofining.

Various methods have been suggested to recover from the hydrofined feed the $H_2S$ and other sulfur impurities. One such method employs a caustic solution which, by an acid-base reaction, converts the $H_2S$ into a form which passes into the aqueous caustic phase. Subsequently the treated hydrocarbon stream is fractionated to recover a $C_5/C_6$ fraction which is ideally suitable for fuels and other useful fractions.

The problem with this impurity removal method is that naphtha is lost to the caustic solution and, furthermore, the spent caustic creates a disposal problem. The spent caustic may not be economically regenerated and merely dumping it into a stream causes acute pollution problems.

Another method suggested to segregate the $H_2S$ and similar impurities from the naphtha has been distillation. However, this method, though theoretically practical, is economically unfeasible if one desires high purity separation, for the number of plates and stringent control necessary to effect such a result by distillation makes it prohibitive under commercial operating conditions.

It has further been suggested that the hydrofined stream be directly contacted with a molecular sieve which will selectively remove the $H_2S$. Though the sieves do provide excellent separation of the $H_2S$ from the naphtha they rapidly become laden with $H_2S$, i.e., spent. This is because of the large amount of $H_2S$ present in the hydrofined naphtha. Furthermore, desorption of the sieve is expensive for the prior art teaches the use of inert gas which must be generated and discarded after use or further treated to recover the desorbed $H_2S$ therefrom.

Accordingly, it is an object of the instant invention to provide a method to remove impurities from an organic or hydrocarbon stream.

It is a further object of this invention to remove $H_2S$ and similar impurities from the $C_5/C_6$ cut from naphtha.

It is still another object of the instant invention to remove water impurities from a water-alcohol mixture.

The above objects are accomplished by distilling the impurity-containing hydrocarbon stream to effect partial segregation of the impurity and hydrocarbon in a distillation zone, recovering the partially purified hydrocarbon, contacting said hydrocarbon with an adsorbent which selectively adsorbs the impurity, recovering the impurity-free hydrocarbon product, employing a portion of said product to desorb spent adsorbent and recycling said desorbed impurity and desorbing product to the distillation zone.

The instant process is restricted in two ways, however. First, the impurity to be removed from the hydrocarbon must have a boiling point either above or below the boiling point of the hydrocarbon or organic material. This allows partial separation to be effected by a distillation zone. Secondly, the impurity must be one that may be selectively adsorbed by an adsorbent. This latter requirement will become more apparent hereinafter.

The instant invention has many advantages. In the first place, it is integrated such that maximum advantage is taken of the distillation zone which may only effect partial segregation of the impurity and hydrocarbon. This advantage results from recycling the desorbing hydrocarbon with the desorbed impurities to the distillation zone. Secondly, employing a portion of the impurity-free product to desorb the off-stream spent adsorbent provides a purge stream having a higher heat capacity than inert gas which is normally employed to remove desorbed constituents from molecular sieves. For example, at 600° F. nitrogen has a heat capacity of 0.256 B.t.u./lb./° F. versus 0.68 B.t.u./lb./° F. for $C_6$ at the same temperature. On a B.t.u./lb./ft.$^3$ basis the difference in heat capacity is, of course, increased. Lastly, the instant invention eliminates the need for an inert gas generator and means to separate the desorbed constituents from the inert purge gas.

The invention, its objects and its advantages will be more readily apparent from a detailed discussion of the specific embodiments shown in the drawings.

Figure 1:
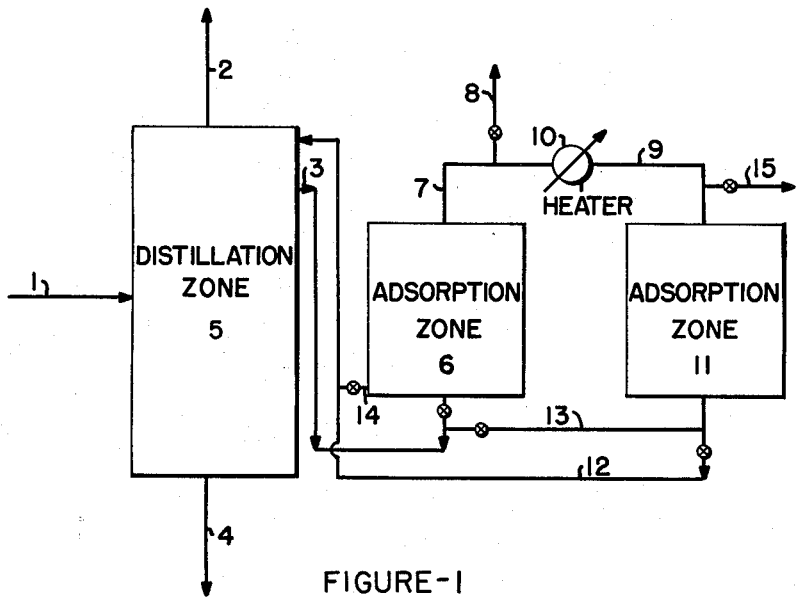
FIGURE 1 is a schematic diagram of the instant invention as it applies to removing impurities such as $H_2S$, water, methyl mercaptan and ethyl mercaptan from a $C_5/C_6$ naphtha cut.

Referring to FIGURE 1, a full range naphtha, i.e., containing constituents boiling in the approximate range of 0–400° F., from a hydrofining process is directed via line 1 into distillation zone 5. The hydrofined naphtha will contain small amounts of $H_2S$ (e.g., 500 p.p.m.), water and other sulfur impurities, such as methyl and ethyl mercaptans. In zone 5 the full range naphtha is segregated into an overhead fraction, a light naphtha ($C_5/C_6$ cut) and a bottoms fraction which are withdrawn frome zone 5 by lines 2, 3 and 4, respectively. The overhead fraction will comprise $C_4$ and lighter hydrocarbons and the lighter boiling impurities such as $H_2S$, water, methyl mercaptan and ethyl mercaptan.

Distillation zone 5 is maintained under pressure conditions in the range of 75 to 125 p.s.i.g., preferably 85 to 100 p.s.i.g. At these conditions the overhead stream 2 will generally be at a temperature in the range of 130 to 170° F., the light naphtha stream 3 at temperatures in the range of about 235 to 275° F. and the bottoms stream 4 at a temperature in the range of about 410 to 450° F.

Though distillation zone 5 effects a substantial amount of separation between the impurities and the desired fraction, i.e., the light naphtha stream, the latter will still contain up to about 50 p.p.m. of $H_2S$ and other residual amounts of water, methyl mercaptans and ethyl mercaptans. In accordance with the instant invention these impurities are removed from the light naphtha stream by directing it via line 3 into adsorption zone 6 wherein it contacts a solid adsorbent which selectively removes from stream 3 the impurities, such as $H_2S$, water, methyl mercaptan, etc. Suitable adsorbents will be discussed in more detail hereinafter.

The contacting of the light naphtha and solid adsorbent may be carried out by any suitable solid-liquid contacting method. Generally, it is preferred to employ a fixed bed of adsorbent and pass the light naphtha therethrough. As the light naphtha is in liquid phase when withdrawn from the distillation zone, it is preferable to conduct the adsorption step in the liquid phase also. Temperatures in zone 6 during adsorption may be within the range of about 70° to 300° F., preferably 100° to 200° F. Pressures may be within the range of 0 to 200 p.s.i.g., preferably 5 to 100 p.s.i.g. Feed rates may be 1 to 20 w./w./hr., preferably 5 to 15 w./w./hr.

The impurity-free light naphtha leaves zone 6 via line 7 and the large proportion of it is withdrawn through line 8 for use as desired. A small portion of it, about 1 to 5%, is passed into heater 10 wherein it is heated and vaporized to a temperature within the range of about 300° to 700° F. and directed by line 9 to adsorption zone 11. This zone, having previously been employed for adsorption, is ready for desorption and vaporized stream 9 effects this result by serving as a desorption medium. The stream 12 leaving zone 11 will thus contain substantially all the impurities previously adsorbed by the adsorbent and this stream is directed back to distillation zone 5 wherein segregation of the impurities from the desired hydrocarbons is effected. It will be readily understood that the concentration of the impurities in stream 12 is much greater than the concentration of these same impurities in the light naphtha recovered in line 3. Thus the impurities are returned to the distillation zone in a more concentrated form and the segregation afforded by zone 5, though incomplete, may be used to advantage.

When zone 6 loses its effectiveness in adsorbing the impurities from the light naphtha stream, the valve in lines 3, 8, and 12 are closed and the valve in lines 13, 15, and 14 opened. This permits zone 11 to undergo an adsorption cycle in all respects similar to that discussed before for zone 6. Impurity-free product is withdrawn via line 9 and a large portion of it withdrawn through line 15 for use as desired. The remaining portion, about 1-5%, continues through line 9 into heater 10 where it is vaporized to a temperature within the range of about 300° to 700° F. and directed to zone 6 for desorption thereof in the same manner discussed hereinbefore with regard to zone 11. The desorbing medium and the desorbed impurities are withdrawn via line 14 and pass through line 12 back into distillation zone 5. When zone 11 loses its effectiveness in adsorbing the impurities from the light naphtha, the cycle is reversed, zone 6 becoming the adsorption zone and zone 11 being desorbed as discussed above.

Where a molecular sieve (a crystalline metallic alumino-silicate) is the adsorbent, it is important in desorbing the molecular sieve that the water content thereof be decreased to less than 2 wt. percent water based on dry sieve, because larger water content blocks $H_2S$ adsorption by the molecular sieve.

Figure 2:
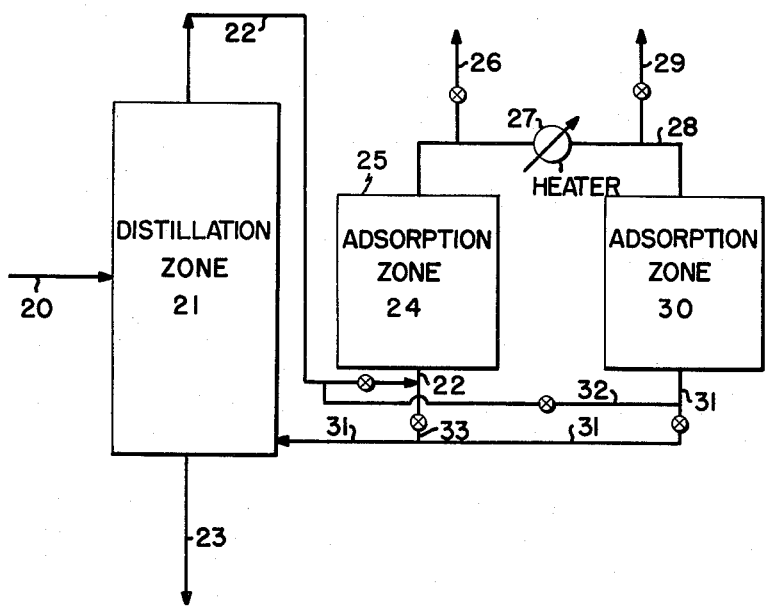
FIGURE 2 is a schematic diagram of the invention as it applies to removing water impurities from a water-isopropanol feed.

Referring now to FIGURE 2 there is illustrated a schematic flow plan for the removal of water from a water-isopropanol feed to yield a pure isopropanol stream. The water-isopropanol stream is directed through line 20 into distillation zone 21. Distillation zone 21 is operated at a temperature in the range of about 150 to 300° F., preferably 170 to 230° F., and at a pressure in the range of 0 to 100 p.s.i.g., preferably 5 to 50 p.s.i.g., so as to effect a separation of water and an azeotropic mixture of water and isopropanol. The distillation column effects a substantial amount of separation, but the purity of the alcohol-rich product is limited by the alcohol-water azeotrope. The water is recovered as bottoms through line 23, while the azeotropic mixture (12.1 wt. percent $H_2O$-87.9 wt. percent alcohol) is removed overhead via line 22 and directed into adsorption zone 24 wherein it contacts a solid adsorbent which selectively removes from stream 22 the water impurities. Suitable adsorbents will be discussed in more detail hereinafter.

The contacting of the azeotropic mixture and solid adsorbent may be carried out by any suitable solid-liquid contacting method. Generally, it is preferred to employ a fixed bed of adsorbent and pass the azeotropic mixture therethrough.

Adsorption may be conducted in liquid or vapor phase, the latter being preferred to avoid transition from liquid phase adsorption to vapor phase desorption. However, if side reactions take place in the vapor phase adsorption (e.g., formation of esters from the alcohol), low temperature conditions and liquid phase adsorption would be required. The following table indicates suitable operating conditions for the adsorption and desorption zones in a water-isopropanol system.

TABLE A

*Operating Conditions for Water-Isopropanol*

| | Adsorption Zone | | Desorption Zone | |
|---|---|---|---|---|
| | Broad Range | Preferred Range | Broad Range | Preferred Range |
| Temperature, °F | 50–300 | 70–250 | 150–800 | 175–700 |
| Pressure, p.s.i.g | 0–100 | 5–50 | 0–100 | 5–50 |
| Feed Rate, w./w./hr | 0.5–5.0 | 1.0–3.0 | 0.05–0.5 | 0.1–0.3 |

The water-free alcohol is withdrawn from the adsorption zone via line 25. The greater portion of it passes through line 26 as product to be used as desired. The remaining portion passes into heater 27 wherein it is vaporized if liquid and/or heated to a temperature in the range of about 150 to 800° F. and directed via line 28 to adsorption zone 30.

Zone 30, having previously been employed for adsorption is ready for desorption and vaporized stream 28 effects this result, serving as a desorption medium. Stream 31 will thus contain substantially all the impurities previously adsorbed by the adsorbent and this stream is directed back to distillation zone 21 wherein segregation of the water from the mixture is effected. It will be readily understood that the concentration of the water in stream 31 is much greater than the concentration of the water in the azeotropic mixture recovered in line 22. Thus the water is returned to the distillation zone in a more concentrated form, thus taking advantage of the segregation, though incomplete, afforded by zone 21.

When zone 24 loses its effectiveness in adsorbing the water from the azeotropic mixture, the valves in lines 31 and 22 and 26 are closed and the valves in lines 32, 29 and 33 are opened. This permits the azeotropic mixture to flow through lines 22, 32 and 31 into zone 30 wherein the water is adsorbed from the azeotropic mixture. The operation of zone 30 for adsorption is similar in all respects to that of zone 24 when it is in the adsorption cycle. The water-free alcohol is recovered via line 28 and a portion thereof passed into heater 27 wherein it is vaporized if liquid and/or heated to a temperature in the range of 150 to 800° F. The major portion of the water-free product is withdrawn via line 29 for use as desired. The heated stream is passed by line 25 into zone 24 for desorption thereof. The vapor stream containing the desorbed water is withdrawn via line 22 and directed through lines 33 and 31 back to the distillation zone 21. When zone 30 loses its effectiveness in adsorbing the water from the azeotropic mixture, the cycle is reversed, zone 24 becoming the adsorption zone and zone 30 being desorbed as discussed above.

Among the adsorbents particularly suitable for the instant invention are crystalline metallic alumino-silicates, which are commonly known in the art as molecular sieves. These molecular sieves have been known to demonstrate the unique property of selectively adsorbing a specific constituent or constituents from a feed which may contain a mixture of many diverse materials. It should be remembered that applicants do not claim that this invention has anything whatsoever to do with the particular adsorbent employed for both the adsorbents and their ability to adsorb the impurities discussed herein is known in the art.

In the naphtha purifying scheme discussed above, a molecular sieve having pore openings in the range of about 3–4 Angstrom units would be suitable, preferably the sodium form of the 4 Angstrom unit molecular sieve (Linde Type 4A). The preparation of Type A sieve is described in U.S. Patent 2,882,244. If no $C_7$ are present a molecular sieve having pore openings of 5–10 Angstrom units may be employed, such as Linde Type 10X and 13X which are the calcium and sodium forms, respectively, of a molecular sieve having pore openings in the range of 8–10 Angstrom units. The preparation of Type X sieve is described in U.S. Patent 2,882,243. If $C_7$ are present, the 8–10 Angstrom unit sieves are unsuitable since the $C_7$ are preferentially adsorbed over the $H_2S$. In this case, the 4 Angstrom unit sieve can be used since it adsorbs $H_2S$ but excludes $C_7$.

In the water isopropanol system discussed above, a molecular sieve having pore openings in the range of about 3 to 10 Angstrom units is suitable, preferably Linde Type 4A which is the sodium form of a molecular sieve having pore openings of about 4 Angstrom units. Silica gel or alumina can also be used as the adsorbents in this system.

It will be readily apparent that the instant inventive concept will have wide application, limited only by the two requirements discussed hereinbefore. Illustrative of other specific instances wherein the invention may be employed are separation of water from various alcohols, ethers, esters, ketones, and aldehydes, which form azeotropes with water.

It is to be understood that the instant invention is not to be limited to the specific embodiments discussed and illustrated herein. This is merely to more clearly exemplify the instant invention.

What is claimed is:

1. A process for recovering a stream of substantially pure organic material from a feed stream containing said organic material in admixture with an impurity, said impurity having a boiling point which differs from the boiling point of said organic material and being capable of being selectively adsorbed by an adsorbent, which comprises distilling said feed stream in a distillation zone to remove a portion of said impurity therefrom, recovering organic material containing a reduced amount of impurities from said distillation zone, contacting said recovered organic material with an adsorbent to remove the impurity in a first adsorption zone, recovering from said first adsorption zone a substantially impurity-free organic material, heating a portion of said impurity-free organic material to a temperature in the range of about 150 to 800° F., passing in a direction opposite to adsorption said heated organic material through a second adsorption zone containing spent adsorbent to desorb said spent adsorbent, recovering from said second adsorption zone a stream comprising the organic material and desorbed impurity, and recycling said recovered stream to said distillation zone.

2. The process of claim 1 wherein upon the adsorbent in said first adsorption zone becoming spent, said recovered organic material is contacted with the adsorbent in said second adsorption zone, recovering from said second adsorption zone a substantially impurity-free organic material, heating a portion of said impurity-free organic material to a temperature in the range of about 150 to 800° F., passing in a direction opposite to adsorption said heated organic material through said first adsorption zone containing spent adsorbent to desorb said spent adsorbent, recovering from said first adsorption zone a stream comprising the organic material and desorbed impurity, and recycling said recovered stream to said distillation zone.

3. A process for recovering a substantially pure light naphtha stream from a full range naphtha containing an impurity boiling below said light naphtha which comprises distilling said full range naphtha in a distillation zone to remove a portion of said impurity therefrom, recovering a light naphtha containing a reduced amount of impurities from said distillation zone, contacting said recovered light naphtha with an adsorbent selectively adsorbent to said impurity in a first adsorption zone, recovering from said first adsorption zone a substantially impurity-free light naphtha, heating a portion of said impurity-free light naphtha to a temperature in the range of about 300 to 700° F., passing in a direction opposite to adsorption said heated light naphtha through a second adsorption zone containing spent adsorbent to desorb said spent adsorbent and recovering from said second adsorption zone a stream comprising the light naphtha and desorbed impurity, and recycling said recovered stream to said distillation zone.

4. The process of claim 3 wherein upon the adsorbent in said first adsorption zone becoming spent, said recovered light naphtha is contacted with the adsorbent in said second adsorption zone, recovering from said second adsorption zone a substantially impurity-free light naphtha, heating a portion of said impurity-free light naphtha to a temperature in the range of about 300 to 700° F., passing in a direction opposite to adsorption said heated light naphtha through said first adsorption zone containing spent adsorbent to desorb said spent adsorbent, recovering from said first adsorption zone a stream comprising the light naphtha and desorbed impurity, and recycling said recovered stream to said distillation zone.

5. The process of claim 3 wherein said impurity is selected from the group consisting of $H_2S$, ethyl mercaptan and methyl mercaptan.

6. The process of claim 3 wherein said adsorbent in said first and second adsorption zones is a molecular sieve having uniform pore openings in the range of about 3 to 4 Angstrom units.

7. The process of claim 3 wherein said light naphtha consists essentially of $C_5$ and $C_6$ hydrocarbons and wherein said adsorbent in said first and second adsorption zones is a molecular sieve having uniform pore openings of about 3 to 10 Angstrom units.

8. A process for recovering a stream of substantially pure isopropanol from a water-isopropanol mixture which comprises distilling said mixture in a distillation zone to remove a portion of the water therefrom, recovering an azeotropic water-isopropanol stream, contacting said azeotropic mixture with an adsorbent selectively adsorbent to the water in a first adsorption zone, recovering from said first adsorption zone a substantially water-free isopropanol, heating a portion of said water-free isopropanol to a temperature in the range of about 150 to 800° F., passing in a direction opposite to adsorption said heated isopropanol through a second adsorption zone containing spent adsorbent to desorb said spent adsorbent, recovering from said second adsorption zone a stream comprising said isopropanol and desorbed water, and recycling said recovered stream to said distillation zone.

9. The process of claim 8 wherein upon the adsorbent in said first adsorption zone becoming spent, said azeotropic mixture is contacted with the adsorbent in said second adsorption zone, recovering from said second adsorption zone a substantially water-free isopropanol, heating a portion of said water-free isopropanol to a temperature in the range of about 150 to 800° F., passing in a direction opposite to adsorption said heated water-free isopropanol through said first adsorption zone containing spent adsorbent to desorb said spent adsorbent, recovering from said first adsorption zone a stream comprising isopropanol and desorbed water, and recycling said recovered stream to said distillation zone.

10. The process of claim 8 wherein said adsorbent in said first and second adsorption zones is a molecular sieve having uniform pore openings in the range of about 3 to 10 Angstrom units.

11. The process of claim 8 wherein said adsorbent is silica gel.

12. The process of claim 8 wherein said adsorbent is alumina.

References Cited in the file of this patent

UNITED STATES PATENTS

| | | | |
|---|---|---|---|
| 1,872,783 | Miller | | Aug. 23, 1932 |
| 1,985,205 | Derr | | Dec. 18, 1934 |
| 2,850,549 | Ray | | Sept. 2, 1958 |
| 2,882,244 | Milton | | Apr. 14, 1959 |
| 2,944,627 | Skarstrom | | July 12, 1960 |
| 2,966,531 | Louis | | Dec. 27, 1960 |
| 3,063,934 | Epperly et al. | | Nov. 13, 1962 |
| 3,070,542 | Asher et al. | | Dec. 25, 1962 |